United States Patent
Sadeghi et al.

(10) Patent No.: US 7,035,696 B1
(45) Date of Patent: Apr. 25, 2006

(54) METHOD AND APPARATUS FOR POLY GATE CD CONTROL

(75) Inventors: Ali Sadeghi, Foster City, CA (US); Sukesh Patel, Sunnyvale, CA (US); Mark Freeland, San Francisco, CA (US); Ole Krogh, Belmont, CA (US)

(73) Assignee: Ahsoon Technologies, Inc., Burlingame, CA (US)

( * ) Notice: Subject to any disclaimer, the term of this patent is extended or adjusted under 35 U.S.C. 154(b) by 234 days.

(21) Appl. No.: 10/189,930

(22) Filed: Jul. 3, 2002

(51) Int. Cl.
*G06F 19/00* (2006.01)

(52) U.S. Cl. ............................ 700/31; 700/29; 700/30; 700/121; 156/345

(58) Field of Classification Search ................. 700/121, 700/29, 30, 31; 156/345
See application file for complete search history.

(56) References Cited

U.S. PATENT DOCUMENTS

| | | | |
|---|---|---|---|
| 4,436,584 A * | 3/1984 | Bernacki et al. ............ 438/696 |
| 5,242,536 A * | 9/1993 | Schoenborn ................ 438/714 |
| 5,402,367 A * | 3/1995 | Sullivan et al. ................. 703/6 |
| 5,527,396 A * | 6/1996 | Saitoh et al. .......... 118/723 MP |
| 5,926,690 A * | 7/1999 | Toprac et al. ................. 438/17 |
| 6,713,365 B1 * | 3/2004 | Lin et al. ..................... 438/424 |

OTHER PUBLICATIONS

"Supervisory Run-to-Run Control of Polysilicon Gate Etch Using In Situ Ellipsometry" -Butler et al, Texas Instruments. IEEE 1994.*
"PID—The Basic Technique For Feedback Control" -Manufacturing.net, Vince VanDoren, Jan. 1, 1997.*

* cited by examiner

*Primary Examiner*—Leo Picard
*Assistant Examiner*—Michael D. Masinick
(74) *Attorney, Agent, or Firm*—Amin & Turocy, LLP

(57) ABSTRACT

Systems and methods are provided that facilitate semiconductor processing, including etch processes. The invention provides real-time two-dimensional etch rate control. Prior to starting an etch process, a control model is selected that relates to the etch process. A formula or function description is developed from the model and solved to obtain process parameter values that are predicted to produce the desired etch rates. During the fabrication etch process, critical dimension measurements of a polysilicon gate are obtained. From these measurements, the etch process is modified so as to achieve a desired horizontal etch rate and a desired vertical etch rate. The etch process results in a polysilicon gate having a desired rectangular profile.

33 Claims, 7 Drawing Sheets

METHOD AND APPARATUS FOR POLY GATE CD CONTROL

TECHNICAL FIELD

The present invention relates generally to semiconductor fabrication, and more particularly to systems and methods of reducing device variations during semiconductor fabrication processes.

BACKGROUND OF THE INVENTION

As dimensions of semiconductor devices decrease, the available process window size decreases and manufacturing design rules shrink requiring tighter control over the manufacturing process. Generally, improvements in semiconductor fabrication (processes) or improvements in structural fabrication are required in order to further decrease critical dimensions and, thereby semiconductor devices. However, tighter control over the manufacturing process can be difficult to achieve, especially as critical dimension decrease further.

Semiconductor fabrication is a manufacturing process employed to create semiconductor devices in and on a wafer surface. Polished, blank wafers come into semiconductor fabrication, and exit with the surface covered with large numbers of semiconductor devices. Semiconductor fabrication includes a large number of steps and/or processes that control and build the devices—basic processes utilized are layering, patterning, doping and heat treatments. Layering is an operation that adds thin layers to the wafer surface. Layers can be, for example, insulators, semiconductors and/or conductors and are grown or deposited via a variety of processes. Some common deposition techniques are chemical vapor deposition (CVD), evaporation and sputtering. Patterning is a series of steps that results in the removal of selected portions of surface layers. After removal, a pattern of the layer is left on the wafer surface. The material removed can be, for example, in the form of a hole in the layer or a remaining island of the material. The patterning transfer process is also referred to as photomasking, masking, photolithography or microlithography. The actual subtractive patterning, i.e. removal of material from the surface film, is done by plasma etching. The goal of the patterning process is to create desired shapes in desired dimensions (e.g., feature size) as required by a circuit design and to locate them in their proper location on the wafer surface. Patterning is generally considered the most important of the four basic processes. Doping is the process that adds specific amounts of dopants to the wafer surface. The dopants can cause the properties of layers to be modified (e.g., change a semiconductor to a conductor). A number of techniques, such as thermal diffusion and ion implantation can be employed for doping. Heat treatments are another basic operation in which a wafer is heated and cooled to achieve specific results. Typically, in heat treatment operations, no additional material is added or removed from the wafer, although contaminates and vapors may evaporate from the wafer. One common heat treatment is annealing, which repairs damage to crystal structure of a wafer/device generally caused by doping operations. Other heat treatments, such as alloying and driving of solvents, are also employed in semiconductor fabrication.

A particularly important fabrication process employed in memory devices and logic devices is the polysilicon gate etch process that forms the polysilicon gate, which is typically utilized for a transistor. This etch process is important in terms of device operation and critical dimensions. Better or tighter control of the etch process results in benefits such as: a) better device characteristics; b) improved device performance; and/or c) improved device yield. Collectively these benefits improve device yield and/or produce devices with additional intrinsic value (e.g., better performance, lower heat dissipation, lowered leakage current). Thus, a stable, accurate and precise polysilicon gate etch process is vital for economic viability of devices in the marketplace.

There are a number of conventional methods and/or systems for controlling gate etch CD. One conventional system is an end point detection system. End point detection systems operate by monitoring selected process observables such as optical emission from plasma, de bias voltage, RF impedance, intensity of laser light reflected from the wafer, a refraction pattern of a broadband light source and the like. Detection of a change, which is associated with the end of the etch process, triggers an alarm causing the etch tool to halt the process with a suitable allocation of over etch time based on the process requirements and chemistry.

Another method involves control models that allow or assist control of the etch time. For this approach, the significant parameter of interest is the etch rate. Given the etch rate for a particular process, input measurements can be performed to determine the total film depth or thickness (measured perpendicular to the wafer surface) that needs to be etched. The etch time is then simply computed by dividing the total distance by the etch rate.

However, these conventional approaches typically utilize a simple linear control model. End point detection employs measurement of process observables to determine when to stop etching whereas the control model approach computes an expected etch time based on the etch rate and the etch distance as input parameters. These approaches are essentially controlled by the amount of etch time (e.g., directly utilizing etch distance and indirectly utilizing end point detection). Additionally, these approaches only consider etching in the vertical dimension, (i.e., perpendicular to the wafer surface) referred to as anisotropic but fail to consider etch rates in other directions such as horizontal or sideways etching, which is typically referred to as isotropic etching. Thus, the conventional approaches are limited in that they are unable to control horizontal etch rates and thereby, unable to adequately control horizontal dimensions of polysilicon gates. The conventional approaches do not enable further reductions in polysilicon gate critical dimensions because of this lack of control.

SUMMARY OF THE INVENTION

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

The present invention relates generally to semiconductor fabrication, and more particularly to systems and methods of reducing device variations during semiconductor fabrication processes. The invention utilizes feed back and feed forward techniques to improve process performance by reducing variations in the process output.

Dynamic process control is enhanced by the present invention so as to improve performance and control of a given fabrication process. Additionally, dynamic tool control is provided which improves performance of process or metrology tools employed in a fabrication process. The invention permits automated fabrication processing such that fabrication can be performed (e.g., remotely) without substantial direct human intervention inside a clean room. Finally, the invention allows multiple control models to be associated with a particular process and/or tool so as to cover an operating range of the process and/or tool.

The present invention facilitates polysilicon gate etch processes so as to allow real-time two-dimensional polysilicon gate profile control (e.g. via tool interfaces that provide access to this granularity of control thereby permitting modification during processing a given wafer). In the one-dimensional case this reduces to controlling gate critical dimensions. The invention provides real-time two-dimensional etch rate control. Prior to starting an etch process, one or more instantiated control models are selected that relate to the etch process. Instantiating a model means binding a model to a particular recipe (e.g., associating CF2 source with CHF3), and fixing the constant values in the model for a particular tool type (e.g. AMAT Centura 5200 MxP chamber) and/or a particular chamber. A set of formulas or function descriptions, which are mathematical representations of the model, are solved to obtain process parameter values (e.g., oxygen flow in sccm) that predict desired etch rates while satisfying other process constraints (e.g., by keeping other attributes within specifications without exceeding operational or fabrication defined limits for an etcher). Prior to the fabrication etch process, critical dimension measurements of a polysilicon gate are obtained. During the etch process, tool state measurements are obtained. From these measurements, the etch process is modified so as to achieve a desired horizontal etch rate and a desired vertical etch rate. The etch process results in a polysilicon gate having a desired rectangular profile.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION OF THE INVENTION

Figure 1:
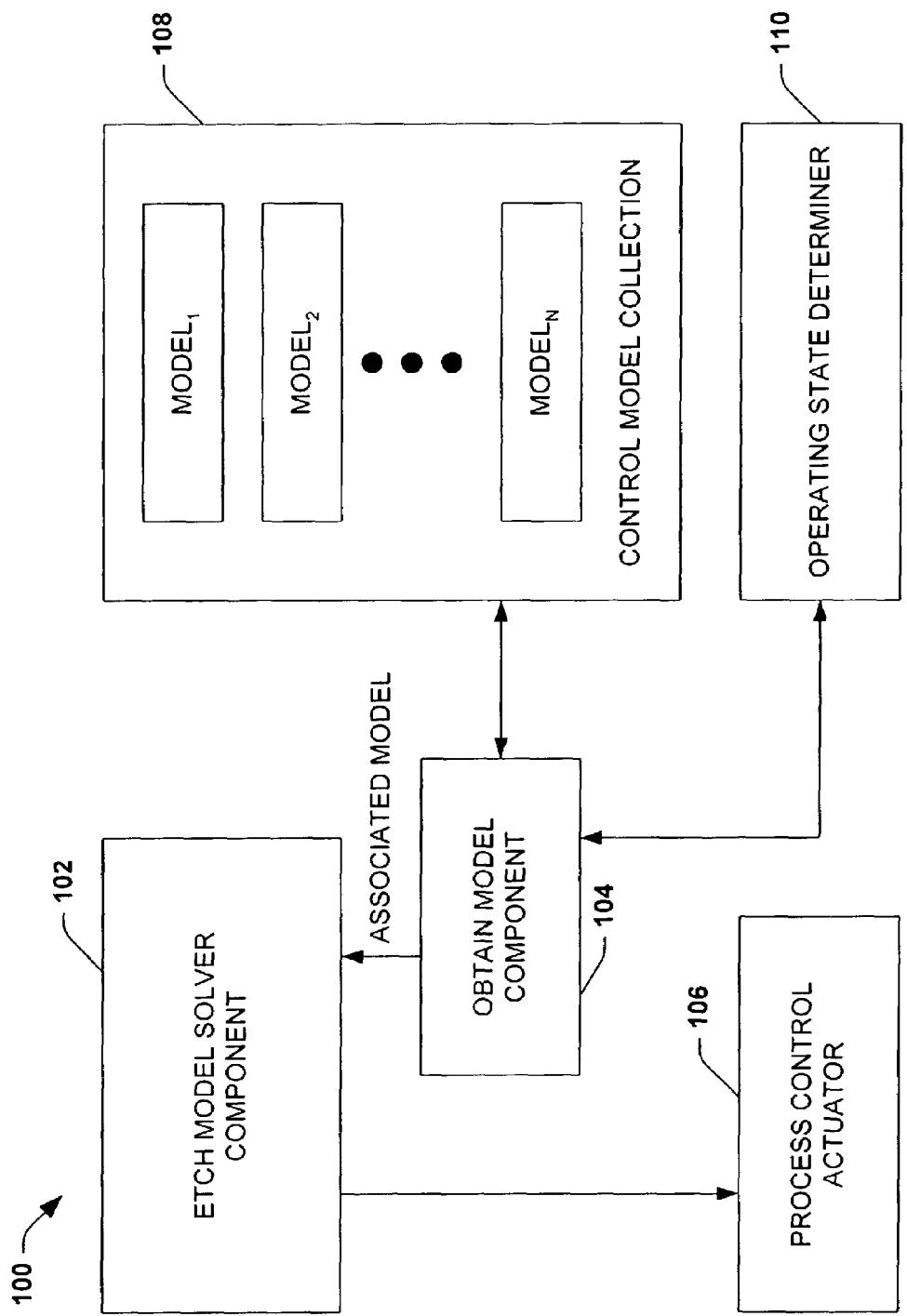
FIG. 1 is a block diagram illustrating a semiconductor fabrication system in accordance with the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

FIG. 1 illustrates a block diagram of a semiconductor fabrication system 100 in accordance with aspect of the present invention. The system 100 includes an etch model solver component 102, an obtain model component 104, a process control actuator 106, a collection of control models 108 and an operating state determiner 110. The system 100 facilitates real-time two-dimensional polysilicon gate surface (e.g., profile or critical dimension) control by adaptively controlling horizontal and vertical etch rates.

The collection of control models 108 stores and maintains a plurality of instantiated control models. A model is said to be instantiated when what each model variable represents is explicitly specified (e.g., a variable representing "inert gas flow" is bound to "He gas flow, in sccm"), and each model constant (e.g., $k_3$) is assigned a numeric value. A given instance of a model is associated with a particular etch recipe (program for the etcher) and etcher chamber type (e.g., AMAT Centura 5200 MxP) or specific chamber. The collection 108 can be modified by adding to and/or removing control models from the collection, or equivalently by activating or deactivating the models (leaving the models available for activation at a later time).

Additionally, respective control models can be updated and improved as test data are obtained from fabrication processes. This feedback loop can be performed automatically and continuously (updating models as each lot is processed and results are measured), automatically and periodically (after a certain time period or number of lots processed), or manually and periodically (enabling human analysis of data and modification of models).

Generally, the respective control models include information such as input variables or parameters, state descriptions (tool states for which the models apply), goals and constraints (desired results and bounds on the etch process), and mathematical predictions of outputs based on the input values and tool state. Input variables can refer not only to direct wafer or lot measurements but lot processing history. Some input variables are fixed by the particular incoming lot or wafer or by system state, while others correspond to process control settings (e.g., amount of pressure) that may be set on the process tool.

The operating state determiner 110 detects current processing conditions referred to as an operating state. The current processing conditions can be observed or reported to the operating state determiner 110 by another component or an ongoing fabrication process (e.g., measurement system). These conditions include information such as fabrication process, stage of the process, observed or measured values, historical information about the tool operation and maintenance, and the like.

The obtain model component 104 receives the operating state from the operating state determiner 110 and retrieves the appropriate active control model(s) or a metamodel from the collection of control models. The metamodel is a collection of models that apply to a given step and chamber under different conditions. The metamodel and/or control model(s) can contain a decision tree to select the appropriate model given the current state resulting is a single applicable, associated model for the current state, lot, process, and step. A more detailed description of a model that can be utilized as the associated model is described with respect to FIG. 4.

The etch model solver component 102 utilizes the associated model to generate process control settings that implement the fabrication process (e.g., etch process). The etch model solver component 102 supports feedforward, producing settings for a given set of inputs. These inputs may represent the next lot or wafer to be processed, or may represent the state of the wafer currently being etched, as control is applied in real-time.

The etch model solver component 102 obtains a solution to the associated model (e.g., functional representation) that considers not only vertical etch rates, but horizontal etch rates as well. The etch model solver component 102 can solve the model by employing a suitable algorithm for solving a formula that meets desired outputs and constraints.

The desired outputs for this aspect include an arbitrary gate two-dimensional surface, which can be shaped by modulating vertical and horizontal etch rates continuously. Examples include but are not limited to gate width (e.g., gate CD) for a given gate height, and gate profile. Implicitly, the desired outputs determine the desired horizontal and vertical etch rates.

However, the computations required for solving such formulae are highly computationally expensive and/or unsolvable. Thus, the etch model solver component in a computationally efficient manner.

The process control actuator 106 receives the control parameters from the etch model solver component 102 and performs the etch process accordingly. The process control actuator 106 includes systems and/or components that physically perform the etch process such as flow rate controllers, measurement devices or systems, pressure controllers and the like. The process control actuator 106 can dynamically modify the etch process based on feedback and/or feed forward information, providing control over the gate profile. Additionally, feedback and/or feed forward information can be provided to the system 100 in order to modify the control parameters sent to the process control actuator 106.

One suitable heuristic that can be utilized by the etch model solver component 102 to obtain a suitable approximate solution is a set-point heuristic. The set-point heuristic is a computationally efficient approach that can be performed in real time. The set-point heuristic starts with a recipe default set-point, which can be obtained from the associated model or in some other fashion. This set-point is tested to see if it is a proper solution (e.g., provides an appropriate horizontal etch rate and an appropriate vertical etch rate). If a solution is not obtained at the recipe set-point, the heuristic expands a radial distance away from the set-point to obtain a locus or set of possible solutions or points. The possible solutions or points can be referred to as the candidate solution space. Then, the set-point heuristic tests a closest point in terms of distance from the recipe set-point and checks the closest point to determine whether it is an acceptable solution. If it is not, a next closest point of the set of possible solutions is analyzed. It is appreciated that the heuristic includes other processing orders of the possible solutions. If the set of possible solutions or points is analyzed without finding a solution, the set-point heuristic once again expands an additional distance from the set-point to obtain a new set of possible solutions or points. The new set of possible solutions or points is analyzed in a similar fashion as the first set of possible solutions or points. The set-point heuristic continues expanding the set of possible solutions until a solution is obtained or there are no more possible solutions to explore.

The output or process parameters from the solution obtained by the etch model solver component 102 characterize the vertical and horizontal etch rates. By controlling these rates in real-time, the shape or profile of the gate is controlled.

Figure 2:
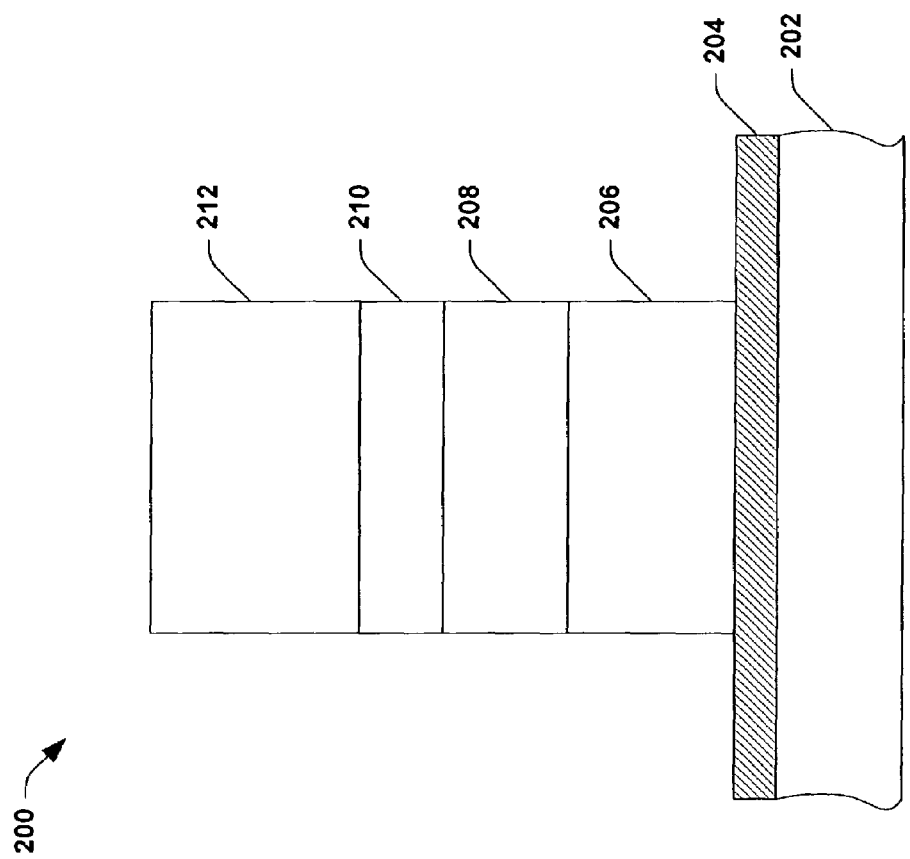
FIG. 2 is a side view of a generalized film stack for polysilicon gate fabrication prior to etching in accordance with the present invention.

FIG. 2 illustrates a generalized film stack 200 for a polysilicon gate fabrication step in accordance with an aspect of the present invention. The generalized film stack 200 is depicted for illustrative purposes and should be considered merely exemplary and can be processed via system 100 of FIG. 1. A gate oxide layer 204 is formed on a semiconductor substrate 202. The substrate 202 is typically comprised of some type of semiconductor material such as silicon. The gate oxide layer 204 is a thin layer of oxide, which operates to insulate a polysilicon gate 206 from the substrate 202. The polysilicon gate 206 is formed on the gate oxide layer 204 and is the conducting gate of a transistor. The polysilicon gate 206 is comprised of doped polysilicon or layers of doped polysilicon and/or various conducting silicides. A dielectric hard mask layer 208 is formed on top of the polysilicon gate 206. The hard mask layer 208 serves to prevent or reduce shorting of the finished device. This layer is often employed for memory devices but can be omitted for logic devices. Subsequently, an antireflective coating 210 is formed on top of the hard mask 208. The antireflective coating minimizes or reduces light reflected by the substrate, which can cause errors in patterning or photolithographic processes. The antireflective coating 210 operates to permit a more accurate patterning process. On top on top of the antireflective coating 210 is a layer of photoresist 212. The photoresist 212 serves to protect areas not to be removed during the etch process. This photoresist 212 can be developed (positive) or undeveloped (negative), depending on whether developed or undeveloped photoresist protects from etching.

Figure 3:
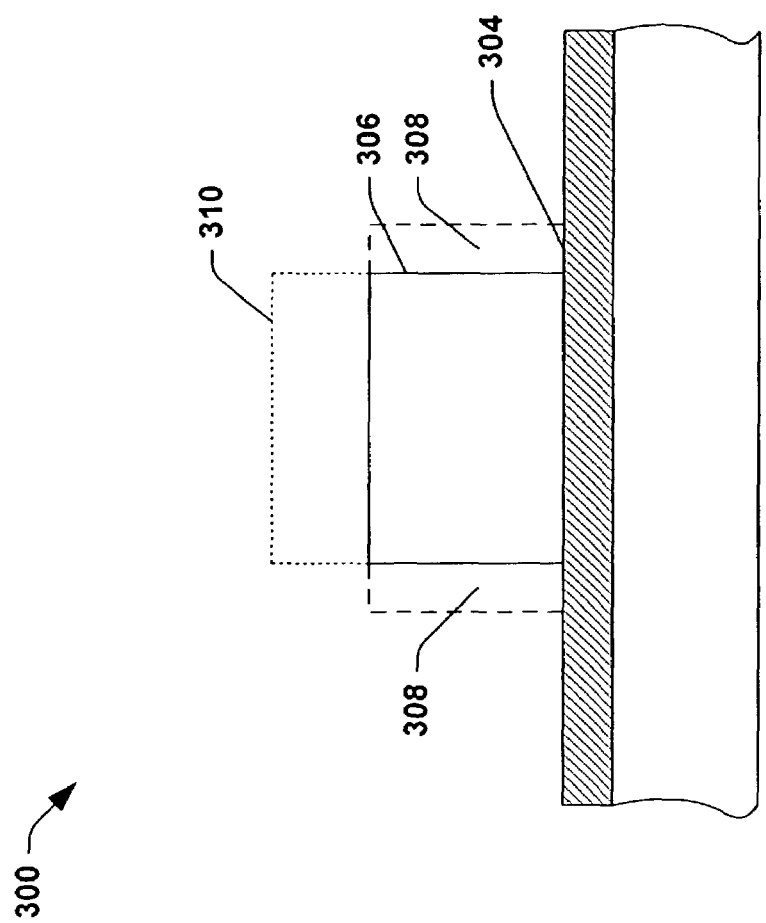
FIG. 3 is a side view of a generalized film stack for polysilicon gate fabrication subsequent to etching in accordance with the present invention.

Turning now to FIG. 3 is the generalized film stack of FIG. 2 after a gate etch has been performed in accordance with an aspect of the present invention. Additionally, resist and the antireflective coatings 310 have been removed. Typically, the gate etch is performed in a series of steps (e.g., two or three). An etching system such as the system 100 of FIG. 1 can be employed to perform the one or more steps to complete the film stack gate etch. A polysilicon gate 306 is depicted on a gate oxide layer 304. The gate oxide layer 304 is, in turn, formed on a semiconductor substrate 302. The removed portions 308 are a result of horizontal etching. The removed portions 308 dimensions and the height and width of the polysilicon gate 306 are selected and result from controlled vertical and horizontal etching. The profile, or "shape" of the vertical surfaces of the polysilicon gate 306 also results from the real-time controlled vertical and horizontal etching.

Figure 4:
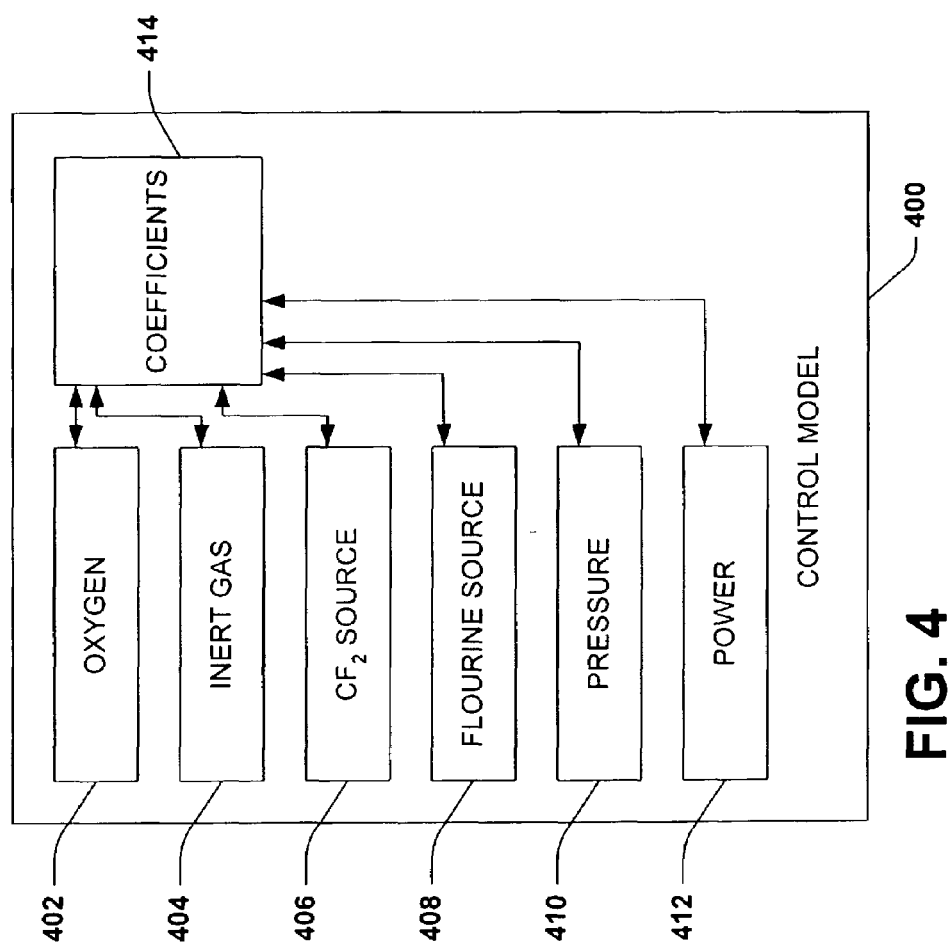
FIG. 4 is a block diagram illustrating a model that facilitates polysilicon gate etch processes in accordance with the present invention.

FIG. 4 is a block diagram illustrating an exemplary model 400 for a gate etch process in accordance with an aspect of the present invention. The model 400 is but one example of a suitable model that can be utilized with the present invention and it is not intended that model and/or control model be limited to this exemplary model 400. The model 400 can be employed as the associated model in system 100 of FIG. 1 or in another suitable control system in order to facilitate controlling of etch rates. Generally, the control model 400 enables predicted outputs by modeling effects of various processing inputs for a particular semiconductor device and/or fabrication process.

The control model 400 includes controllable or settable input variables (i.e., factors), which are oxygen 402, an inert gas 404, a $CF_2$ source 406, a fluorine source 408, pressure 410 and power 412. The control model 400 also includes coefficients 414 that are operative to modify the input variables (e.g., scale the input variables for a linear model). Additionally, other information such as constraints and/or goals can be included with the control model. The $CF_2$ source 406 is typically obtained from a source such as $CHF_3$, $C_4F_8$ and $C_3F_8$. The fluorine source is typically obtained from a source such as $CF_4$, $C_2F_6$, $NF_3$ and $SF_6$. The inert gas is generally helium or argon.

Predicted outputs (e.g., etch rates) and process parameters settings can be obtained from the control model to control both vertical and horizontal etch rates. The ratio between the vertical etch rate (e.g., anisotropic, perpendicular to a wafer surface) and the horizontal etch rate (e.g., isotropic, including parallel with a wafer surface) is a measure of the etch process and it is sensitive to the process parameters in a complicated manner. The etch rate ratio ($R_{rate}$) (vertical etch rate/horizontal etch rate) is larger than 1 in a plasma, $R_{rate}>1$.

Altering some settings will increase the vertical etch rate while decreasing or minimally affecting the horizontal etch rate, thus increasing $R_{rate}$. Altering other settings will increase the horizontal etch rate while decreasing or minimally affecting the vertical etch rate, thus decreasing $R_{rate}$. Still other settings may affect both horizontal and vertical etch rate in the same direction, often leaving the effect on their ratio uncertain. But the relationships between the $R_{rate}$ and the process parameter settings can be established through experiments that dynamically monitor and control the polysilicon gate etch process. Thus, one can construct instantiated models to be employed by the etch model solver component 102.

Generally, the effect of an increase in the supply of an agent, e.g., oxygen, depends on the film to be etched. Thus, in case of etching organic film layers such as photo resist and organic ARC layers, an increase in the oxygen flow will increase both vertical and horizontal etch rates. In contrast, an increase in the oxygen flow when etching polysilicon will decrease both etch rates due to formation of silicon dioxide on the film surface. However, in both cases the horizontal etch rate is likely to be proportionally more affected than the vertical etch rate, because the horizontal, isotropic rate is exclusively dependent on the concentration of neutral radicals, whereas the vertical, anisotropic etch rate is additionally dependent on ion bombardment which itself is scarcely affected by the change in oxygen flow. However, the proportional variation depends sensitively on film stack materials.

An increased $CF_2$ source decreases vertical and horizontal etch rates depositing polymers which slow down all etch rates. An increased fluorine source increases the vertical and horizontal etch rates in a similar manner to that of increased oxygen flow when etching photo resist and ARC layer, but has the opposite effect when etching polysilicon.

Increased pressure has multiple effects. Some of these include: decreasing horizontal etch rate by increasing the residence time in the chamber and allowing for more polymer deposition; and reducing vertical etch rate by impeding ion bombardment. The net effect of increased pressure is an increase in trimming (i.e. a narrower gate width) indicating a reduced $R_{rate}$.

Increased bias power enhances the vertical etch rate because it increases vertical acceleration of ions. Consequently, $R_{rate}$ increases. Higher plasma density produces greater dissociation, resulting in more reactive neutrals (radicals) which directly increases the horizontal etch rate, thus decreasing $R_{rate}$ Likewise, higher flows of gasses that are precursors for radicals such as $O_2$ in trim steps decrease $R_{rate}$.

Decreasing the inert gasses in some processes can actually make the horizontal etch rate become negative (e.g., the gate CD is grown, rather than etched away). This is the result of increasing residence time in the chamber, allowing for more deposition of polymers, which is referred to as the deposit effect.

Thus, by controlling the input variables, the horizontal and vertical etch rates can be controlled. For a typical polysilicon gate etch process, a linear control model is of the form:

$$\text{CD bias} = k_1 v_1 + k_2 v_2 + k_3 v_3 + \ldots + k_n v_n + K$$

Where, $v_1, v_2, v_3, \ldots v_n$ are input variables, representing both parameters that can be controlled, e.g., by the process control actuator 106, and variables that represent measurable input conditions that vary but are known at the time of etch. The former include, but are not restricted to, individual gas flows, RF power settings for different frequencies, chamber pressure, wafer pressure, etch time, etc., as well as quantities that can be mathematically derived from controllable parameters (e.g., a ratio of gas flows). The latter may include similar inputs which cannot be controlled by the process control actuator 106.

$k_1, k_2, k_3, \ldots k_n$ are numeric (constant) coefficients

K is a numeric constant and

CD bias is defined as D1–F1 where D1 is the measured photo resist gate width and F1 is the desired output gate width.

Setting $v_1, v_2, v_n$ controls the ratio of horizontal to vertical etch rates.

However, it is appreciated that other forms and variations of control models and/or associated models can be employed and still be in accordance with the present invention. In particular, one is not limited to linear control models.

With fixed settings of inert gas and power, the following is an example of a form of an exemplary model to control a horizontal etch rate that includes values for the coefficients and input variables. It assumes a fixed etch time, and expresses the total amount of horizontal etching over that time.

horizontal etch (nm)=0.0208889 nm

−0.0033 (pressure−75 mTorr)/25 mTorr

+0.01585 (O$_2$ flow−11.5 sccm)/8.5 sccm

−0.00165 (CHF$_3$/CF$_4$−1.25)/0.75

−0.0014 (pressure−75 mTorr)/25 mTorr*

(O$_2$ flow−11.5 sccm)/8.5 sccm

−0.00275 (pressure−75 mTorr)/25 mTorr*

(CHF$_3$/CF$_4$−1.25)/0.75

−0.00425 (O$_2$ flow−11.5 sccm)/8.5 sccm*

(CHF$_3$/CF$_4$−1.25)/0.75

It is appreciated that other suitable forms/models can be employed in accordance with the present invention.

Figure 5:
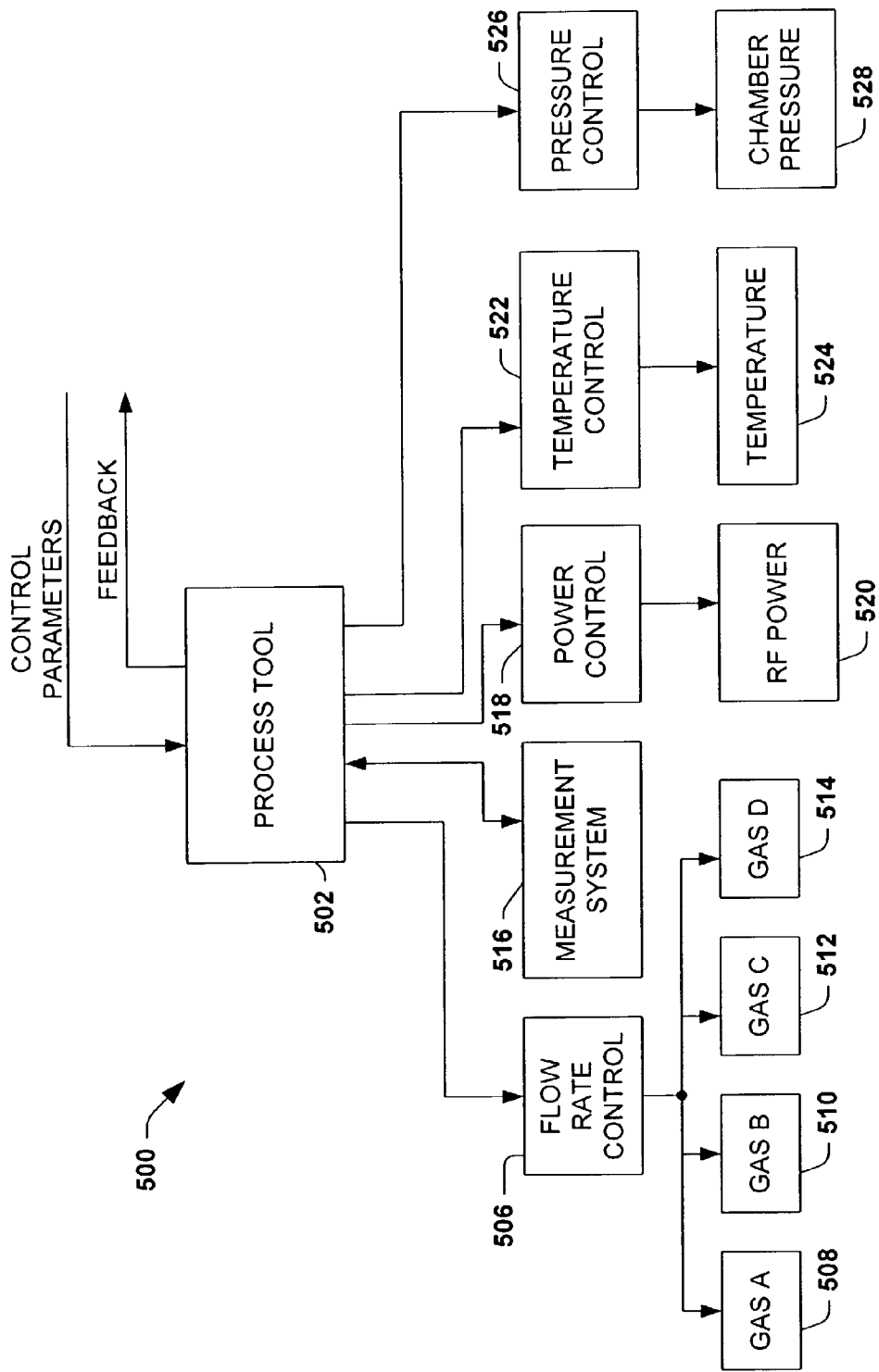
FIG. 5 is a block diagram of an etch control and fabrication system in accordance with the present invention.

Turning now to FIG. 5, a block diagram of an etch control system 500 in accordance with an aspect of the present invention is depicted. The system 500 facilitates in situ measurement and control during semiconductor fabrication etch process. The system 500 not only controls vertical etching of a semiconductor device, but also controls horizontal etching of the semiconductor device. The system 500 can perform fabrication processes with or without substantial direct human intervention inside the fabrication clean room. The etch process defines gate width and profile which has a significant impact on device yield and on transistor performance (e.g., leakage current and threshold voltage).

A process tool 502 is operative to control the etch process based on control parameters received. Typically, the control parameters are received from a controller component that determines and provides suitable testing parameters and are based on an associated model such as described with respect to FIG. 4. Additionally, the process tool 502 can provide feedback information to that component to further improve the process or modify the current etch process. One suitable component that can be employed is system 100 of FIG. 1.

Returning to FIG. 5, a flow rate control 506 is controlled by the process tool 502. The flow rate control adjusts and maintains flow rates of gas A 508, gas B 510, gas C 512 and gas D 514 during the etch process. Additionally, the flow rate control 506 controllably maintains a ratio of the flows of the gases to each other (e.g., ratio of flows of gas C 512 and gas D 514). Some typical gases that can be employed for a polysilicon gate etch process are oxygen, inert gas, and CF$_2$ and fluorine source gases; however other suitable gases can be utilized.

A measurement system 516 monitors current test conditions and provides measurements in situ to the process tool 502. The process tool 502 can then modify one or more of the respective controls based on the measurements or can provide that information as feedback to the process control actuator (not shown). The measurement system 516 is also controlled by the process tool 502 and is operative to measure test conditions such as, but not limited to, thickness of layers, dimensions, composition, temperature, chamber pressure, flow rates and the like. Additionally, the measurement system 516 is operative to measure in situ properties of the various materials and/or layers of the semiconductor device.

The measurement system 516 is further operative to measure thicknesses of various semiconductor layers formed and etched at various locations. Specifically, the measurement system 516 measures the critical dimensions in situ of the polysilicon gate (e.g., height and width).

A number of suitable techniques can be employed to perform measurements, such as optical interference, ellipsometry, capacitance and use of an associated color chart and the like. Additionally, microprocessor controlled optical techniques such as optical interference, optical emission spectroscopy (OES) and spectroscopic ellipsometry can be utilized. Another suitable technique is scatterometry which involves extracting information about a surface upon which an incident light has been directed. One or more gratings can be located on an interior surface (e.g., wall) of the chamber. Light reflected and/or passed through the one or more gratings has a particular intensity and/or phase and is collected by a light detection component of the measurement system 516. Other suitable scatterometry systems can be employed and still be in accordance with the present invention.

A power control 518 is also dynamically controlled by the process tool 502. The power control 518 is configured to selectably provide RF power 520 at one or more desired frequencies (e.g., RF power of frequency P or RF power of frequency Q). Additionally, a temperature control 522 is dynamically controlled by the process tool 502. The temperature control 522 is operative to regulate the wafer temperature 524 as instructed by the process tool 502. Finally, a pressure control 526 is also employed to dynamically control and maintain a chamber pressure 528. Likewise, the pressure control 526 is dynamically controlled by the process tool. It is appreciated that alternate aspects of the invention can include additional controls and/or remove controls.

The process tool 502 manages the various controls in the system 500 in accordance with the control parameters (e.g., respective gas flows, gas ratios, power, temperature, chamber pressure and the like). The controls are generally set to values specified as a solution to a formula based on the associated control model. As such, the system 500 is able to dynamically modify process conditions so as to control the horizontal etch rate as well as the vertical etch rate thereby producing a semiconductor device having desired characteristics (e.g., dimensions). It is appreciated that the system 300, although described with respect to a polysilicon gate etch is not so limited. Variations of the system 500, such as for other types of etch process or other types of fabrication processes, can be implemented and still be in accordance with the present invention.

Figure 6:
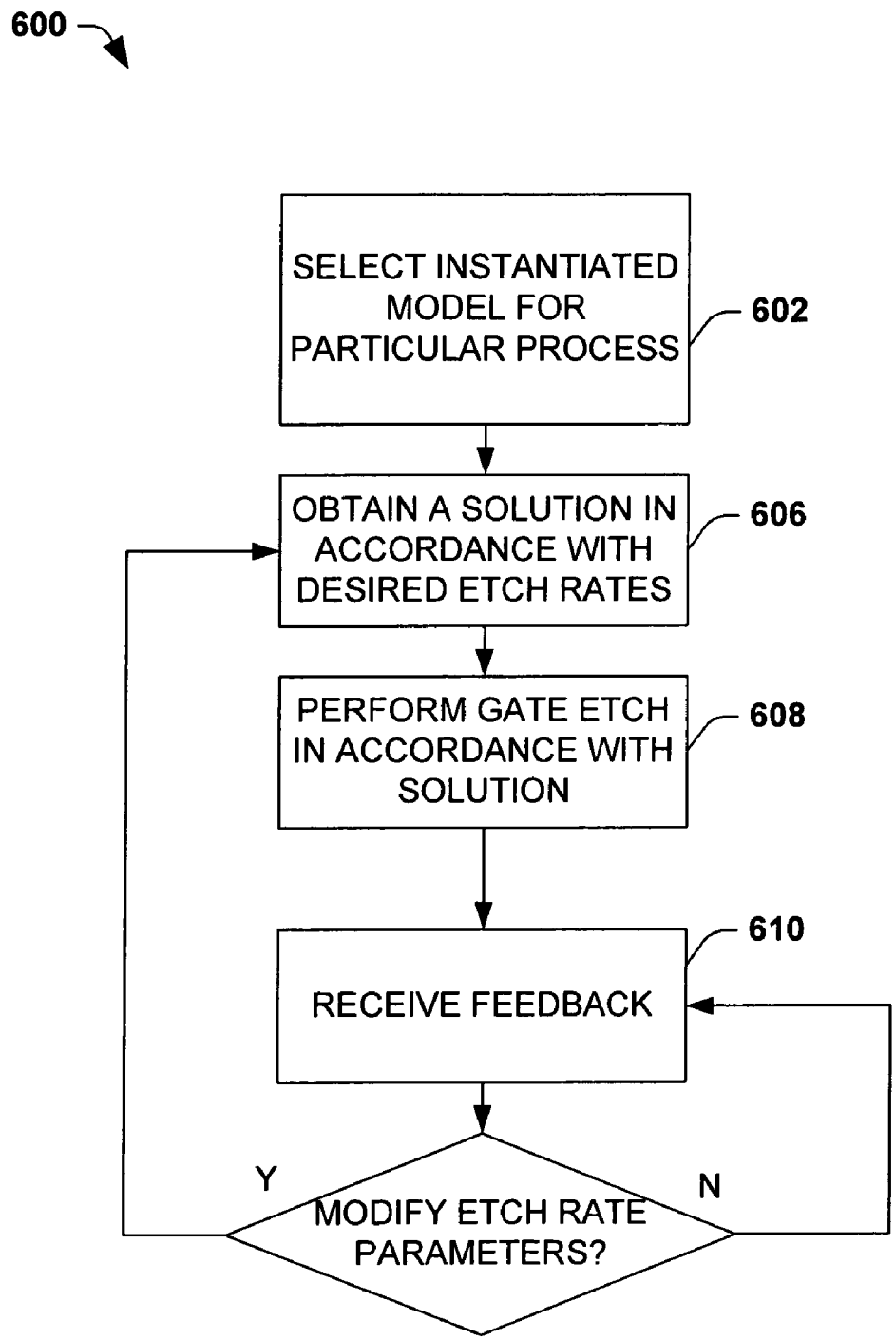
FIG. 6 is a flow diagram illustrating a method for facilitating control of an etch process in accordance with the present invention.
Figure 7:
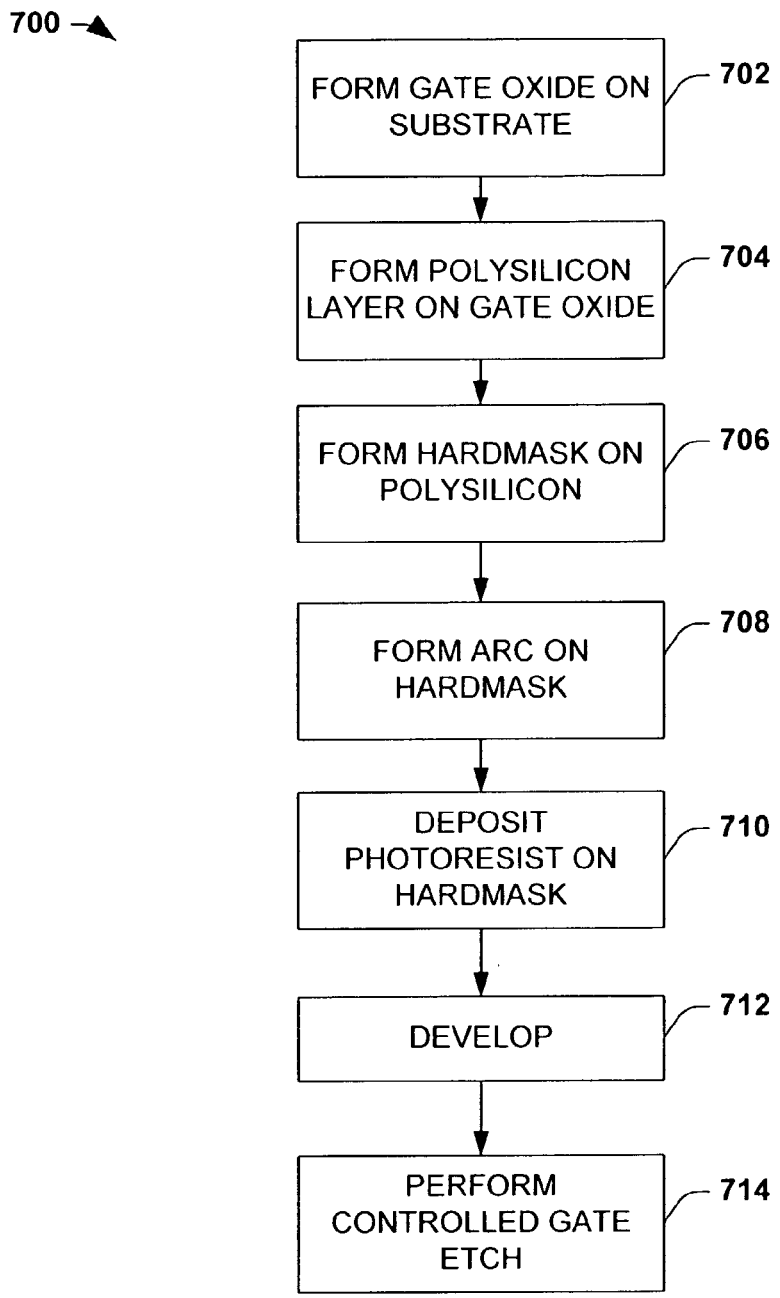
FIG. 7 is a flow diagram illustrating a method of fabricating a semiconductor device in accordance with the present invention.

In view of the foregoing structural and functional features described above, methodologies in accordance with various aspects of the present invention will be better appreciated with reference to FIGS. 6–7. While, for purposes of simplicity of explanation, the methodologies of FIGS. 6–7 is depicted and described as executing serially, it is to be understood and appreciated that the present invention is not limited by the illustrated order, as some aspects could, in accordance with the present invention, occur in different orders and/or concurrently with other aspects from that depicted and described herein. Moreover, not all illustrated features may be required to implement a methodology in accordance with an aspect the present invention.

Turning now to FIG. 6, a flow diagram of a method 600 that facilitates control of an etch process is depicted. The method permits real time dynamic updating of control of the etch process so as to produce desired critical dimensions. The method 600 can tighten variations in the process output (e.g., gate line width) by actively controlling horizontal and vertical etch rates.

The method 600 begins at 602 where the appropriate, instantiated model is selected from a collection of control models. The model selected is the one designed and instantiated for the particular etch process (recipe) to be used, and for the current state of the process tool 502. Further description of control models and the associated model is omitted here for brevity.

A solution is then obtained at 606 based on the selected model and the current etch process. The solution is that set of parameters values and settings which, according to the selected model, result in desired etch rates for the current etch process, without violating constraints specified in the model. Typically, the solution or approximate solution is obtained utilizing a heuristic such as the set-point heuristic previously described.

After obtaining the solution, the method 600 continues at 608 by performing or continuing to perform the current etch process. The etch process is performed with controlled vertical and horizontal etch rates. While the process is being performed, measurements are continuously being made and feedback information is generated at 610. Generally, the feedback information indicates that the etch process is continuing as expected and at the predicted etch rates. However, if the feedback information indicates that the process parameters need to be modified, the method returns to 606 to obtain a new solution (e.g., new parameter settings). At 606, the new solution is obtained by factoring in the feedback information. The feedback information is also collected, aggregated, and used to improve the model in the control model collection 108.

FIG. 7 depicts a flow diagram of a method 700 of fabricating a polysilicon gate on a semiconductor device in accordance with an aspect of the present invention. The method 700 controls both horizontal and vertical etch rates during the fabrication process.

Beginning at 702, a gate oxide layer is formed on a substrate. The substrate is some type of semiconductor material such as silicon. A polysilicon layer is then formed on the gate oxide at 704. The polysilicon layer can be comprised of a number of individual polysilicon layers and is comprised of doped polysilicon and/or other various conducting silicides. A hardmask, which can protect the device during and after fabrication, is then formed on the polysilicon layer at 706, which mitigates shorting the semiconductor device in subsequent process steps. The hardmask can be omitted for logic devices but is generally utilized for memory devices. An antireflective coating is formed on the hardmask at 708. The antireflective coating serves to eliminate light reflected from the substrate layers, in a gate stack primarily poly, during the patterning process. Then, photoresist or resist is deposited on the antireflective coating at 710 by a suitable deposition method. Subsequently, exposure of the photo resist through a mask or reticle and resist development operations are performed at 712 to select etch and non-etch regions. Continuing at 714, a controlled gate etch is performed wherein both vertical and horizontal etch rates are monitored and controlled so as to obtain a polysilicon gate of desired dimensions. The polysilicon gate can generally be more accurately produced by the method 700 because of the etch rate control performed. Additionally, the critical dimensions of the polysilicon gate produced tend to be of a more desirable rectangular shape than is otherwise produced by convention methods.

It is appreciated that variations of the method 700 and other fabrication methods can be performed utilizing control of vertical and horizontal etch rates and still be in accordance with the present invention. The method 700 is but one of any number of suitable methods.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A semiconductor fabrication system comprising:
   a collection of control models;
   an operating state determiner;
   a mechanism that selects a model from the collection and adapts the model based on real-time measurements and inputs; and
   an etch model solver that determines process parameter values according to the selected model that result in a desired horizontal etch rate and a desired vertical etch rate, the process parameter values are transformed into requests for etch actuators in real-time.

2. The system of claim 1, further comprising an operating state determinator that dynamically obtains a current operating state and interacts with the mechanism that selects the model to facilitate selection of the model.

3. The system of claim 1, further comprising a process control actuator that receives the process parameter values and performs a fabrication process in accordance with the process parameter values.

4. The system of claim 1, the collection of control models being modifiable by adding and/or removing control models from the collection.

5. The system of claim 1, the collection of control models updates respective control models of the collection based on additional training data.

6. The system of claim 1, further comprising a measurement system that obtains feedback information utilized for calibration of the model.

7. The system of claim 1, the selected model including input variables, settings, constraints, and predictions, the predictions based on the input variables and the settings.

8. The system of claim 1, the selected model including formulae describing functional relationships for a horizontal etch rate, a vertical etch rate, desired goals and constraints that determine targeted device properties.

9. The system of claim 8, the targeted device properties including a gate profile.

10. The system of claim 1, the process parameters being dynamically modified for an actual horizontal etch rate and/or actual vertical etch rate differing from the desired horizontal etch rate and the desired vertical etch rate.

11. The system of claim 10, the modification of process parameter values being based on real-time feedback information.

12. The system of claim 1, the process parameter values obtained via a solution of a formula functionally describing horizontal and vertical etch rates as a function of input variables and settings.

13. The system of claim 12, the solution obtained by solving the formulae.

14. The system of claim 12, the solution obtained via a heuristic that computationally efficiently identifies an approximate solution.

15. The system of claim 14, the heuristic being a set-point heuristic.

16. A semiconductor fabrication system for fabricating a semiconductor device, the system comprising:
- a process tool that dynamically receives control parameters and performs a polysilicon gate etch process, the control parameter values predicted to effect a desired vertical etch rate and a desired horizontal etch rate;
- a measurement system that dynamically measures process conditions and provides measurements to the process tool; and
- a plurality of controls that physically modify process conditions and that are controlled by the process tool.

17. The system of claim 16, the control parameters and specific values obtained via one or more control models.

18. The system of claim 16, the control parameter values obtained via a set-point heuristic that identifies an approximate solution.

19. The system of claim 16, the measurements comprising at least one of critical dimensions, gate profiles, and actual etch rates.

20. The system of claim 19, the critical dimensions indicating that actual etch rates differ from expected etch rates.

21. The system of claim 20, the process tool further generates feedback information based on the measurements from the measurement system.

22. The system of claim 16, the plurality of controls including a flow rate control.

23. The system of claim 22, the flow rate control adjusted to modify $O_2$ flow.

24. The system of claim 22, the flow rate control adjusted to achieve a given $CHF_3/CF_4$ gas flow ratio.

25. The system of claim 22, the plurality of controls further including a pressure control that modifies chamber pressure.

26. The system of claim 22, the plurality of controls further including an RF power control that modifies the RF power absorbed by the plasma.

27. The system of claim 22, the plurality of controls further including a separate RF source power control and a RF bias power control that modifies RF power absorbed by plasma.

28. The system of claim 22, the plurality of controls further including a separate RF source power control and a RF bias power control that modify a ratio between source power and bias power absorbed by the plasma.

29. The system of claim 22, the plurality of controls further including a control of the helium pressure behind the wafer that controls the wafer temperature.

30. The system of claim 16, further comprising a high performance storage management system that maintains measurements.

31. The system of claim 16, the semiconductor device being a memory device.

32. The system of claim 16, the semiconductor device being a logic device.

33. A semiconductor fabrication system comprising:
- means for selecting one or more control models that relate to an etch process;
- means for building an associated model from the control model that includes a functional prediction of vertical and horizontal etch rates;
- means for obtaining a solution to the associated model that predicts a desired horizontal etch rate and a desired vertical etch rate, the solution comprising process parameters; and
- means for performing the etch process according to the process parameters.

* * * * *